(12) United States Patent
Hagenbuch

(10) Patent No.: US 9,505,332 B2
(45) Date of Patent: Nov. 29, 2016

(54) VEHICLE RECOVERY TOOL

(71) Applicant: LeRoy G. Hagenbuch, Peoria Heights, IL (US)

(72) Inventor: LeRoy G. Hagenbuch, Peoria Heights, IL (US)

(*) Notice: Subject to any disclaimer, the term of this patent is extended or adjusted under 35 U.S.C. 154(b) by 0 days.

(21) Appl. No.: 14/032,901

(22) Filed: Sep. 20, 2013

(65) Prior Publication Data

US 2014/0084566 A1   Mar. 27, 2014

Related U.S. Application Data

(60) Provisional application No. 61/704,344, filed on Sep. 21, 2012.

(51) Int. Cl.
*B60P 3/07* (2006.01)
*B60P 3/12* (2006.01)

(52) U.S. Cl.
CPC . *B60P 3/07* (2013.01); *B60P 3/127* (2013.01)

(58) Field of Classification Search
CPC ....................................................... B60P 3/07
USPC ......... 280/292, 402; 414/462, 463, 465, 466
See application file for complete search history.

(56) References Cited

U.S. PATENT DOCUMENTS

| | | | |
|---|---|---|---|
| 3,417,890 A | 12/1968 | Kichisaburo | |
| 3,635,492 A | 1/1972 | Mauldin | |
| 3,800,966 A | 4/1974 | Newton | |
| 5,326,215 A * | 7/1994 | Eberhardt | 414/563 |
| 5,435,586 A | 7/1995 | Smith | |
| 5,775,868 A | 7/1998 | Mann | |
| 6,371,505 B1 | 4/2002 | Turner, II | |
| 6,874,803 B2 | 4/2005 | McDougall et al. | |
| 7,547,179 B1 * | 6/2009 | Edmonson | 414/563 |
| 7,950,685 B2 * | 5/2011 | Hagenbuch | 280/423.1 |
| 8,317,215 B2 | 11/2012 | Quenzi et al. | |
| 2001/0001637 A1 | 5/2001 | Zanzig et al. | |
| 2004/0213658 A1 | 10/2004 | Hedley et al. | |
| 2005/0158162 A1 | 7/2005 | Shubert | |
| 2009/0322057 A1 | 12/2009 | Quenzi et al. | |

OTHER PUBLICATIONS

Search Report and Written Opinion of co-pending International Application No. PCT/US2013/060944.
Preliminary Report on Patentability for international Application No. PCT/US2013/060944, dated Apr. 2, 2015.
*Farm Industry News, Smart Buyer*, retrieved from http://www.retrieverth.com/th_features.html on Jul. 10, 2012 (3 pages).
International Search Report and Written Opinion for related International Application No. PCT/US2012/045990 dated Sep. 28,2012.

* cited by examiner

*Primary Examiner* — Joseph Rocca
*Assistant Examiner* — Felicia L Brittman
(74) *Attorney, Agent, or Firm* — Leydig, Voit & Mayer, Ltd.

(57) ABSTRACT

A vehicle recovery tool is used to tow disabled vehicles. The recovery tool includes a structural member that is mounted on an axle assembly including wheels. The structural member is configured to be coupled to or engage a vehicle to be towed that is positioned behind the recovery tool and to be coupled to or engage a towing vehicle positioned in front of the vehicle. A linear actuator is used to lift the structural member as well as the vehicle to be towed to a raised position. With the structural member in the raised position, the linear actuator further positions the structural member into a locked position in which the load of the vehicle being towed is supported by a control linkage against a stop, preferably on the axle assembly.

29 Claims, 7 Drawing Sheets

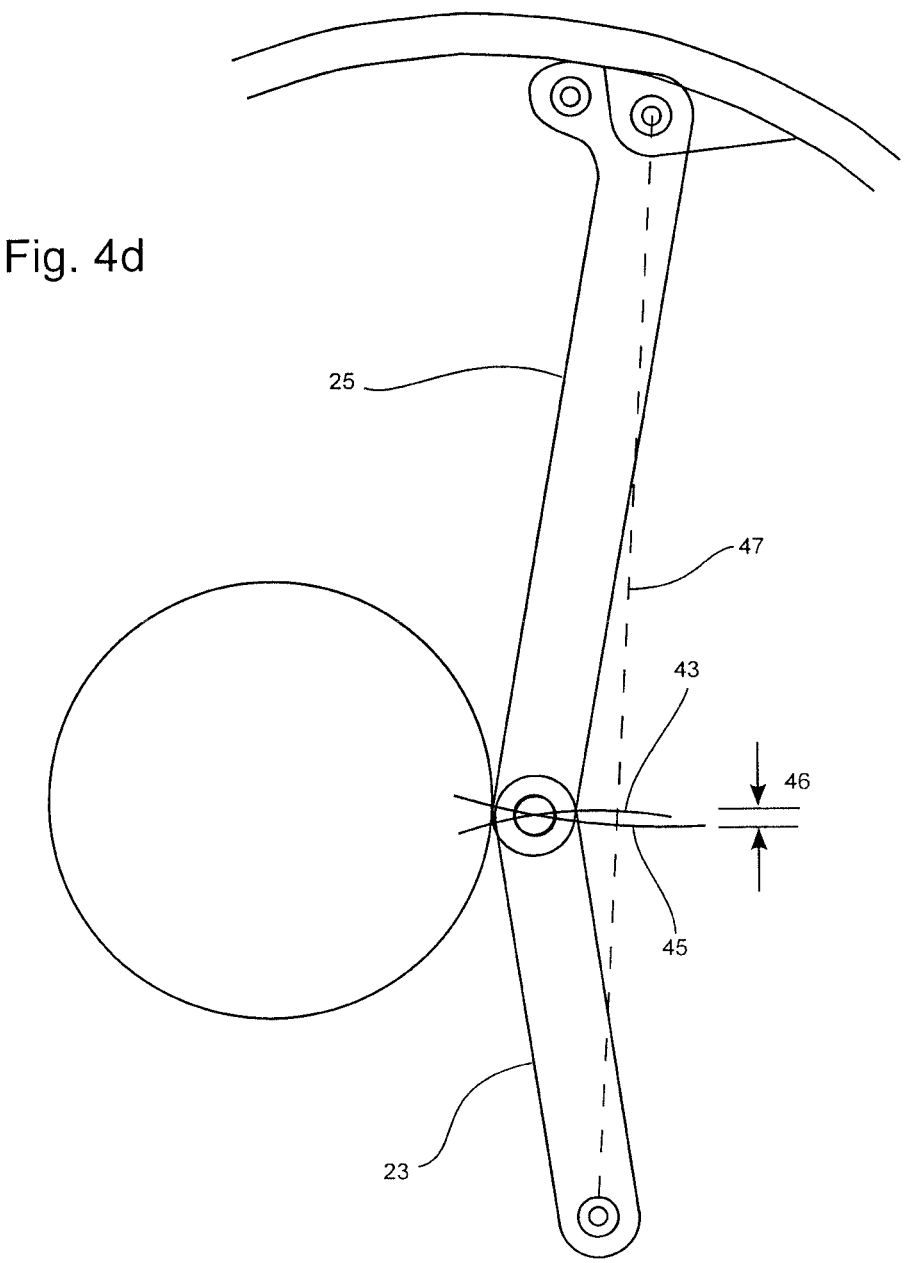

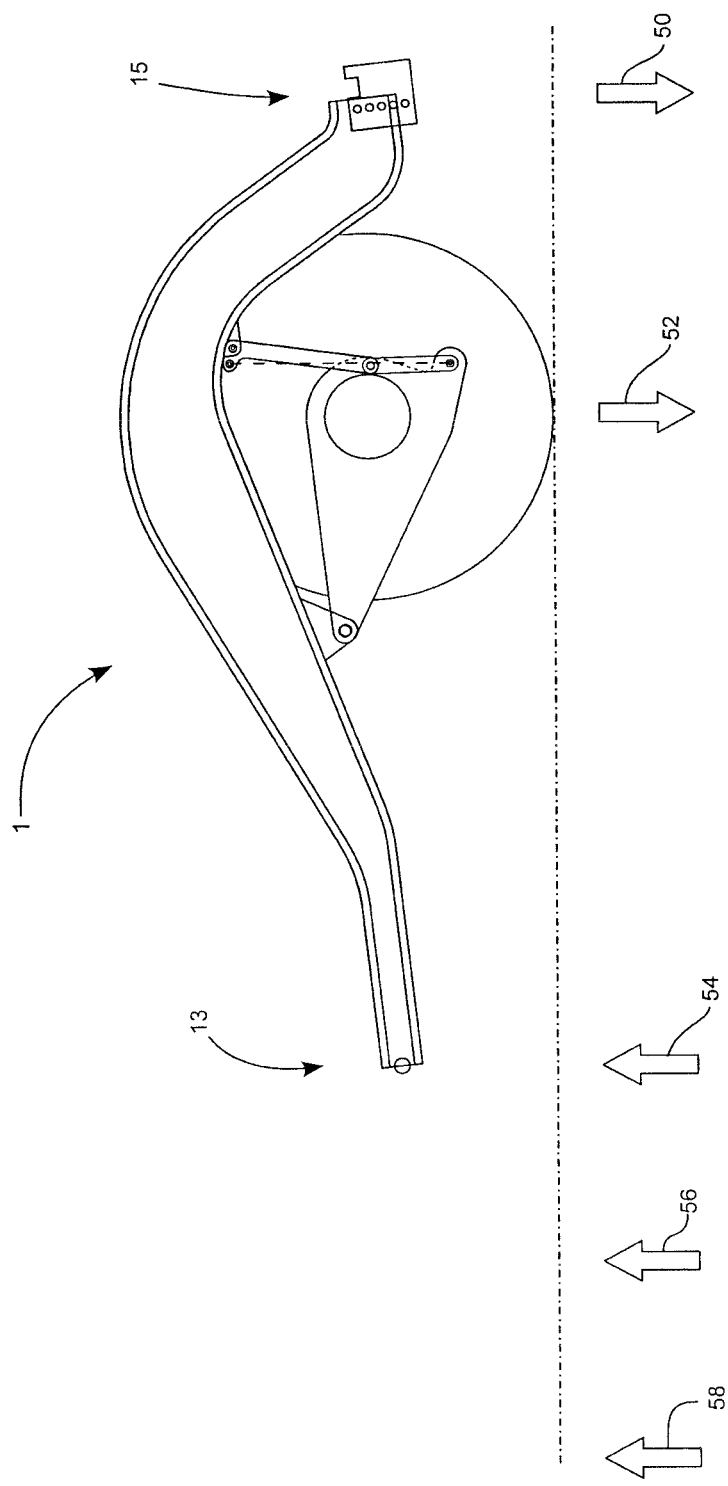

VEHICLE RECOVERY TOOL

CROSS REFERENCE TO RELATED APPLICATIONS

This application claims priority to U.S. Provisional Patent Application No. 61/704,344, filed Sep. 21, 2012, which is hereby incorporated by reference herein in its entirety.

FIELD

The present invention is directed to a tool for assisting in moving large vehicles, particularly large disabled off-highway vehicles.

BACKGROUND

Many industrial operations, particularly mining operations, use large off-highway vehicles. In recent years, the size of these vehicles has grown dramatically. Currently, the largest off-highway trucks can have payloads of four-hundred tons or more and the empty weight of these vehicles can exceed three-hundred tons. In view of the size of these vehicles, the expense to manufacture and purchase them is also significant. Accordingly, in order to recoup costs of such vehicles as quickly as possible, they are often operated continuously twenty-four hours per day. The constant operation of these vehicles, coupled with sometimes harsh environmental conditions can be challenging and it is not unusual for an off-highway truck or vehicle to occasionally become disabled. Because of the sheer size and weight of such off-highway trucks or vehicles the task of recovering and/or retrieving such a disabled off-highway truck or vehicle and moving it to a repair facility can be unique and challenging.

Off-highway trucks in particular are one of the most prevalent mobile vehicles on a typical mine site. By way of reference, 90 to 95% availability of a mine off-highway truck fleet is considered excellent availability, with 5% to 10% of the off-highway truck fleet being unavailable or disabled at any time. Accordingly, in a fleet of fifty off-highway trucks, at any given time, five trucks might be disabled and in need of repairs. Assuming that there are five disabled trucks at a given time, it is reasonable to expect that at least two or three of these trucks becomes disabled at some distance from the site's maintenance and repair facility.

The typical way to move disabled off-highway trucks is to either tow them with chains or cables or pick them up by the front bumper to get the off-highway truck's front tires off the ground and then pull on the front bumper to move the off-highway truck and/or pick them up at the rear preferably near the rear axle to get the off-highway truck's rear tires off the ground and then pull on this rear attachment point to move the off-highway truck. To understand the forces required to lift the front of such an off-highway truck, consider a two hundred fifty ton capacity off-highway truck. The 'empty' weight of such an off-highway truck is about two hundred fifty thousand pounds. The vertical force required to lift the front of this vehicle, when empty, is about ninety thousand pounds. To understand the forces required to lift the rear of such an off-highway truck, consider a two hundred fifty ton capacity off-highway truck. The 'empty' weight of such an off-highway truck is about two hundred fifty thousand pounds. The vertical force required to lift the rear of this vehicle, when empty, is about one hundred thousand pounds. In contrast, if the vehicle is in the 'loaded' condition, this off-highway truck can weigh about eight hundred fifty thousand pounds and the force required to lift the front bumper would be about one hundred eighty thousand pounds and the force required to lift the rear axle would be about five hundred sixty thousand pounds. Thus the preferred approach is, where possible, to pull a disabled off-highway truck from the front.

In some mines, it is typical to use a dedicated off-highway truck towing chassis with an incorporated lifting hook extending rearward from the off-highway truck towing chassis to hook on and lift/pull the disabled vehicles. The rearward extended lifting hook must extend far enough behind the rear tires of the towing chassis so that the rear tires of the towing chassis do not come into contact with the front of the disabled vehicle as the pair of vehicles move or turn. Thus, this lifting arrangement requires an off-highway truck towing chassis that is heavy enough to counterbalance the load imparted on the lifting hook when one end (e.g., the front end) of the disabled vehicle is picked up. Accordingly, it is often necessary to counterweight the front bumper of the towing chassis. Consequently, when not towing a disabled vehicle, the front axle of the off-highway truck towing chassis is often near overload or overloaded. Also, when the off-highway truck towing chassis has lifted and is towing a disabled vehicle, the rear axle of such an off-highway truck towing chassis is carrying an extreme load and may tend to be overloaded.

Accordingly there are disadvantages associated with the conventional off-highway truck towing chassis that uses the above-described towing hook. One major disadvantage is the rear axle loading of the off-highway truck towing chassis that occurs when towing a disabled vehicle. The entire load being picked up and towed is being carried on the rear axle of the off-highway truck towing chassis. Another significant disadvantage is that a front bumper counter balance weight is normally required on the off-highway truck towing chassis. These two factors severely impact the off-highway truck towing chassis, i.e., the rear axle loading when towing a disabled vehicle and the counterbalanced front axle load weight when not towing a vehicle, which may often result in extreme wear on the off-highway truck towing chassis at the front and rear chassis axles. Another drawback is the mechanical disadvantage at which the towing or lifting arrangement operates. When operating from the rear of the off-highway truck towing chassis, the size of the hydraulic cylinders and hydraulic oil flow required to raise and lower this lifting/towing hook is large. A further issue is the inability to easily move the lifting or towing hook sideways as it aligns with a companion socket on the disabled vehicle's bumper. An additional drawback to the conventional towing arrangement is the sheer structural size required to operate at a considerable distance behind the rear tires of the off-highway truck towing chassis.

In view of the foregoing a need has developed to provide a superior lifting and towing arrangement for all sizes of off-highway vehicles and in particular for disabled off-highway trucks that are either empty or loaded.

SUMMARY

The present invention is directed to a vehicle recovery tool in the form of a trailing axle arrangement for picking up and towing vehicles. The recovery tool includes a structural member that is mounted on an axle assembly including wheels. The structural member is configured to be coupled to or engage a vehicle to be moved and is positioned between this vehicle and a towing vehicle to which it is coupled to or engaged with positioned in front of the structural member. A linear actuator, such as a hydraulic cylinder, is used to lift the vehicle engagement point of the structural body and the vehicle to be towed to a towing raised position. With the structural member in the raised position, the linear actuator further positions the structural member into a locked position in which the load of the vehicle being towed is supported by an over center control linkage.

BRIEF DESCRIPTION OF THE DRAWINGS

The present invention will be described in even greater detail below based on embodiments shown in the figures. The invention is not limited to the described and illustrated embodiments. All features described and/or illustrated herein can be used alone or combined in different combinations in embodiments of the invention. The drawings illustrate the following:

FIGS. 4a-4d illustrate movement of the control linkage between the lowered position and raised position;

FIG. 5 illustrates exemplary forces on the vehicle recovery tool of FIG. 2; and

DETAILED DESCRIPTION

Figure 1:
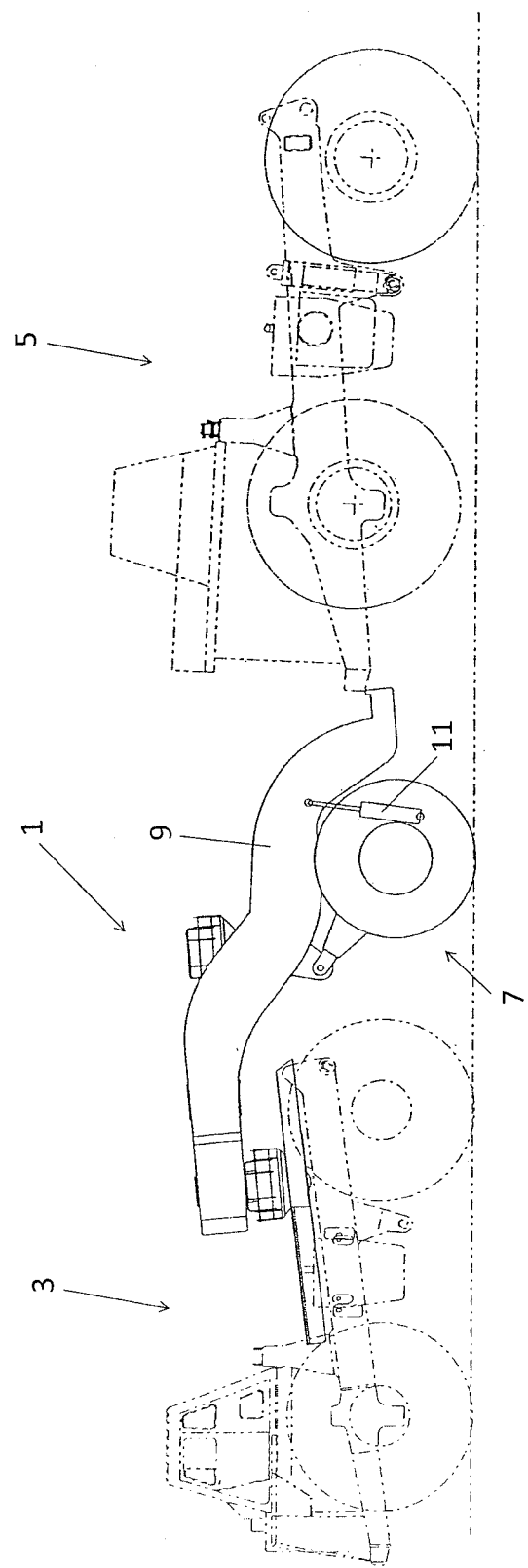
FIG. 1 shows a vehicle recovery tool attached to a hauling vehicle and to a disabled vehicle, with the disabled vehicle in a raised position.

FIG. 1 illustrates a vehicle recovery tool 1 coupled to a towing chassis 3 and lifting a portion of disabled off-highway vehicle 5. The vehicle recover tool 1 is formed as a trailing axle arrangement that is configured to follow the towing chassis 3 and carry a portion of the vehicle being towed 5. The recovery tool 1 includes an axle assembly 7 with a structural frame including an axle housing with an axle 9 disposed therein. Connected to the axle assembly 7 is a structural member 9 that engages the towing chassis 3 and the disabled vehicle being hauled 5. With the structural member 9 engaging the disabled vehicle, a linear actuator 11 is extended to lift the structural member and a portion of the disabled vehicle engaged therewith. Accordingly, the front end of the vehicle being towed is raised, allowing the vehicle to be moved.

The structural member 9 can engage the towing vehicle 3 and the vehicle being towed, and the term "engage" as used herein is intended to incorporate each of these methods. For example, the structural member 9 can engage the respective vehicle by being securely coupled thereto using a connection, such as the hitch shown between the towing chassis 3 and structural member 9 in FIG. 1. Alternatively, the structural member 9 can engage the respective vehicle by a less constraining connection, such as the hook used to lift the vehicle being hauled 5 in FIG. 1. Further still, the engagement between the structural member 9 and the towing or hauled vehicle can be simple surface contact within a pocket on the towed vehicle. In view of the masses involved, surface contact alone can provide enough friction to ensure a relatively secure connection.

The structural member 9 is preferably in the form of a single fabrication or single member, such that a portion of the load of the vehicle being towed 5 is directly transmitted to the hauling vehicle 3. The phrase "single fabrication" includes both integrally-formed one-piece constructions, as well as constructions that include material connections of several pieces, such as by welding. The phrase "single fabrication" excludes moving joints or linkages. Preferably, the structural member 9 is formed of a structural material, such as metal, for example steel.

In the illustrated embodiment, the linear actuator 11 is a hydraulic cylinder. In this case the linear actuator is a double acting linear actuator such that the vehicle being towed can be lifted and then lowered again. Linear actuators other than hydraulic cylinders are also foreseeable within the scope of the present invention.

Additional embodiments of vehicle recovery tools that can be used with aspects of the present invention, along with exemplary vehicles that can be moved using the recovery tool, as well as vehicles that can be used to tow the vehicle recovery tool are described in greater detail in U.S. patent application Ser. No. 13/544,913, filed Jul. 9, 2012, which is hereby incorporated by reference herein in its entirety.

Figure 2:
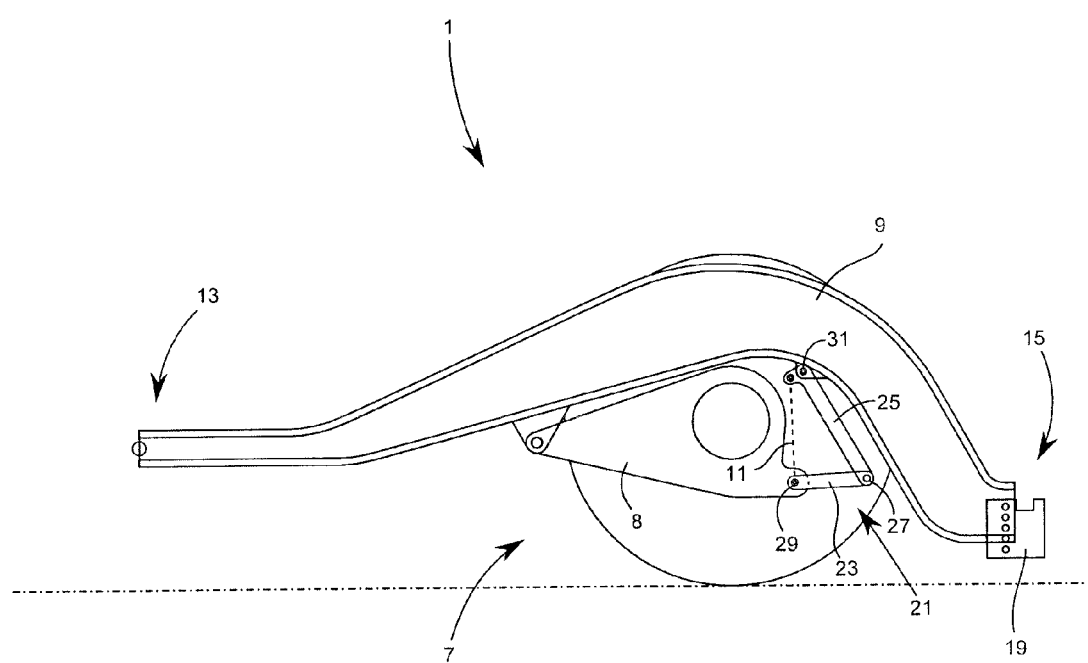
FIG. 2 shows a vehicle recovery tool including a control linkage in a lowered position.

The recovery tool shown in FIG. 1 is configured to attach, at its front end, to a raised hitch on a prime mover. Accordingly, this embodiment of the recovery tool has an elevated front end. In contrast, the recovery tool 1 shown in FIG. 2 is configured to attach to a lower hitch on the towing vehicle 3. Similar to the embodiment in FIG. 1, the recovery tool in FIG. 2 includes a structural member 9, an axle assembly 7 and a linear actuator 11, which is schematically illustrated in FIGS. 2-6 with a dashed line indicating the line of action of the actuator. Preferably, the structural member 9 is formed as a single fabrication, without any moving joints and includes a first section 13 configured to engage the towing vehicle 3 that is located at the front of the vehicle recovery tool 1. The structural member 9 also includes a second section 15 disposed at a rear end of the vehicle recovery tool 1 that is configured to engage the vehicle being towed 5. As illustrated in FIG. 2, the physical connection between the recovery tool 1 and the towing chassis 3 or the vehicle being towed 5 can be achieved with an intermediary component, such as the adjustable hook 19 shown in FIG. 2. Another possible intermediary component is a universal hitch. Preferably, if such an intermediary component is used, the component provides a direct transmission of vertical forces between structural member 9 and the disabled vehicle. In other words, while the intermediary component can provide laterally pivoting between the structural member 9 and the engaged disabled vehicle, it preferably does not allow vertical pivoting. Accordingly, in view of the single fabrication of the structural member, vertical loading is transmitted from the disabled vehicle being towed to the towing vehicle without passing through any vertically pivoting joints.

The vehicle recovery tool 1 shown in FIG. 2 includes a control linkage 21 configured to lock the vehicle recovery tool 1 in a raised position once the towed disabled vehicle has been lifted and support the load in the raised position. Thus, the control linkage 21 relieves the linear actuator 11 from bearing the load during towing. The illustrated control linkage 21 has two links, including a lower link 23 and an upper link 25 connected by a central pivot 27. The lower link 23 is connected to a frame 8 of the axle assembly 7 at an axle assembly pivot 29 and the upper link 25 is connected to the structural member 9 at a body connection pivot 31. In the position shown in FIG. 2, the structural member 9 is in a lowered position with the control linkage 21 substantially folded in an idle position.

Figure 3:
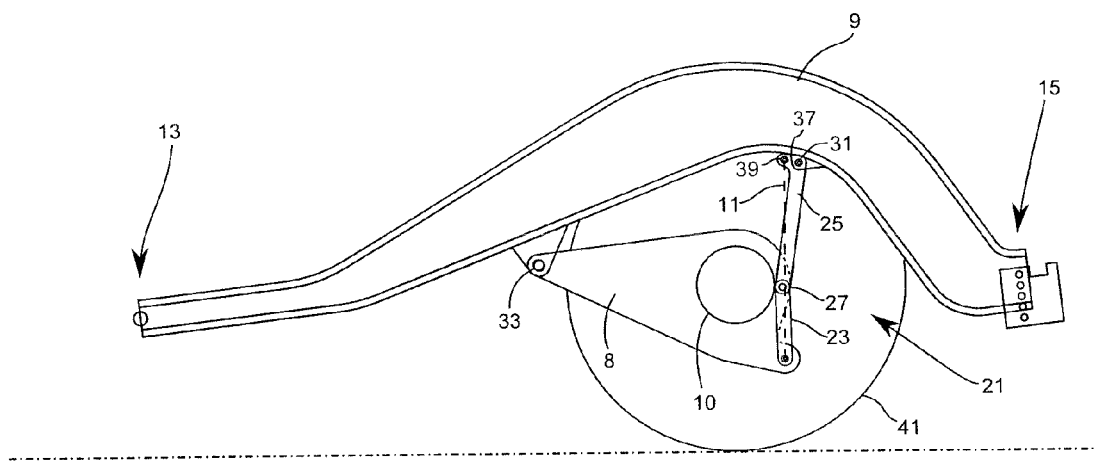
FIG. 3 shows the vehicle recovery tool of FIG. 2 in a raised position.

FIG. 3 shows the structural member 9 in a raised position where the control linkage 21 has been raised by the linear actuator 11 and is locked such that the control linkage 21 bears any load on the structural member 9 against a stop 10 preferably part of the axle assembly 7. Specifically, the control linkage 21 transmits a portion of the load on the structural member 9 to the stop 10 such that the linear actuator 11 is relieved of this load. As illustrated in FIG. 3, the axle assembly frame 8 is connected to the structural member 9 at a structural pivot 33 disposed in front of the axle and axle housing 35. As a result of the structural pivot 33, the lifting of the structural member 9 is substantially limited to the rear section 15 of the structural member 9, while the front section 13 of the structural member remains substantially in place.

In the embodiment illustrated in FIG. 3, the linear actuator 11 does not act directly on the structural member 9. Instead, in order to lift the structural member, the linear actuator 11 is attached to a lateral arm 37 of the upper link 25 at an actuator pivot 39. As the linear actuator 11 is extended, the upper link 25 is raised, thereby raising the structural member 9 through its attachment to the upper link 25 at the body pivot 31. Once the linear actuator 11 reaches the fully extended position, the control linkage 21 is arranged in the static over center locked position, as explained in more detail below.

Figure 4A:
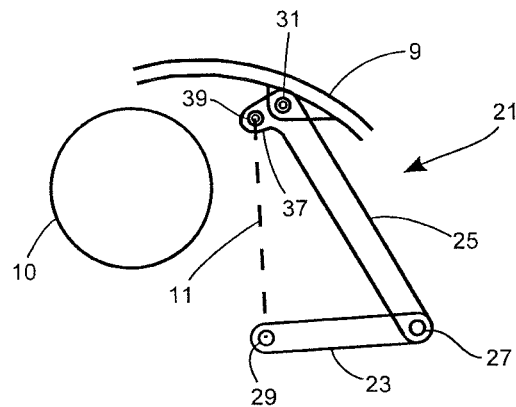
Figure 4B:
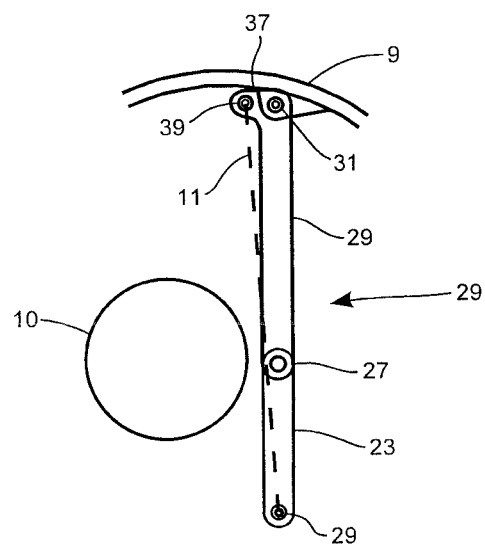
Figure 4C:
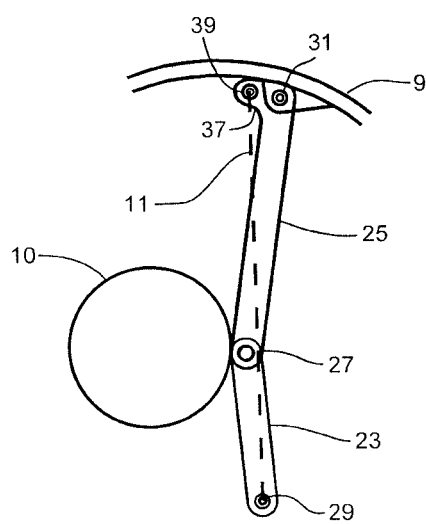

FIGS. 4a-4d illustrate the movement of the control linkage 21 from the idle folded position, shown in FIG. 4a, to the static over center locked position, shown in FIG. 4c. FIGS. 4a-4c show a select group of components of the recovery tool 1 to illustrate the movement of the control linkage 21. Specifically, the axle housing 35 and axle assembly pivot 29 are illustrated without the remaining elements of the axle assembly. It should be understood that, in view of the tire 41 (see FIG. 3) being disposed on a support surface, such as the ground, the axle housing will remain stationary during the illustrated movement of the control linkage 21. Likewise, the assembly pivot 29, which is connected to the axle housing 35 by the axle assembly frame 8, will also remain stationary. In contrast, as the linear actuator 11 is extended, the control linkage 21 will elongate and rise along with the support structure 9, of which only a small portion is shown. In the position illustrated in FIG. 4a, the linear actuator 11 is in a fully retracted position. It should be understood that the terms fully retracted and fully extended, as used herein, are only in reference to the operation of the recovery tool. Thus, the linear actuator will be in the "fully extended position" when it reaches its greatest length attained during normal operation of the recovery tool. The fully extended position need not be the greatest possible extension capable of the actuator itself, given no constraints. Nor is the fully retracted position necessarily the most retracted position that the actuator is capable of independent of the recovery tool.

As the linear actuator 11 is extended and the structural member 9 is raised, the center pivot 27 of the control linkage 21 moves through an arc as a result of the constraint of the lower link 23. When the control linkage 21 is in the idle and folded position shown in FIG. 4a, the center pivot 27 is disposed at a first end of the arc. As the linear actuator 11 extends, the center pivot 27 rises and moves toward a stop 10 preferably on the axle housing, until it reaches a second end of the arc, as shown in FIG. 4c. Alternatively, the stop can be formed directly on or both of the links 23, 25, such that the links are able to support the load themselves when in the over-center position. Along the path of the arc, the center pivot 27 also passes through a top dead center position in which the first and second links are aligned such that a line between the axle assembly pivot 29 and body pivot 31 falls on and is in line with the center pivot 27

When the center pivot 27 reaches the top dead center position the structural member 9 is at the highest point in the path from the lowered position to the raised position, as shown in FIG. 4b. In particular, the body pivot 31 is at its highest point. However, at the top dead center position of the control linkage 21, the linear actuator 11 is not yet fully extended and instead is only at an intermediate position near the fully extended position. As the linear actuator 11 continues to extend it forces the lateral arm 37 of the upper link 25 further upward causing the upper link to continue moving through and past the top center position. In FIGS. 4a-4d, the linear actuator 11 causes a continued clockwise rotation of the upper link 25 after it passes the top dead center position. Once the links 23, 25 are no longer aligned, the structural member 9 is no longer at its absolute highest position. Accordingly, once the center pivot 27 reaches the second end of the arc, the load of the structural member 9 pushes the linkage in the direction further away from the top dead center position. However, movement in this direction can be impeded by a stop 10 preferably on the axle assembly frame 8, such as the axle housing, as shown in FIG. 4c. Thus, in the position of FIG. 4c the load of the structural member 9 is transmitted through the control linkage to a stop 10 preferably on the axle assembly 7, at both the point where the center pivot 27 rests against the stop 10 on the axle housing and at the axle assembly pivot 29, which is fixed on the frame 8. With the control linkage 21 in this over center position, the load on linear actuator 11 is relieved. Of course, it is also possible that other components of the axle frame 8 or the structural member 9 bear the load of the structural member 9 as transmitted through the control linkage 21.

Once the control linkage 21 is in the locked over center position the load of the structural member 9 prevents it from lowering back to the idle position. As illustrated in FIG. 4d, the arcs 43 and 45 illustrate the natural path of the respective lower and upper links 23, 25 when in the locked position. As shown in this drawing, the distance 46 between arcs 43, 45 along the line 47 from the body pivot 31 to the axle assembly pivot 29 demonstrates the distance that the structural member needs to be raised in order to pass back through the top dead center position and be lowered. Thus, without any targeted force on the control linkage the structural member will safely stay in the raised locked position. On the other hand, the structural member 9 can be moved back to the lowered position, by simply retracting the linear actuator 11. The initial retraction of the linear actuator 11 from the fully extended position results on a force on the lateral arm 37 of the upper link 25, impelling the upper link to rotate back through the top dead center position. Once the control linkage 21 passes the top dead center position, the control linkage will naturally continue back to the idle position as the linear actuator 11 is further retracted.

FIG. 5 illustrates exemplary forces on a system using the vehicle recovery tool 1. As an example, a 400 ton class off-highway truck lifted by the rear portion 15 of the recovery tool 1 will result in a downward load 50 of approximately 179,000 lbs on the rear portion of the structural member 9. This load can be easily carried by the axle assembly, which in the exemplary embodiment has a maximum axle load 52 of 469,000 lbs. As a result of the lengthened front end of the recovery tool 1, a mechanical advantage is achieved resulting in an upward force 54 on the front portion 13 of the structural member of 100,000 lbs. With a greater length of the front of the structural member 9, the upward force at the front of the recovery tool could be further reduced to the loads 56, 58, which are 75,000 lbs. and 60,000 lbs., respectively.

Figure 6:
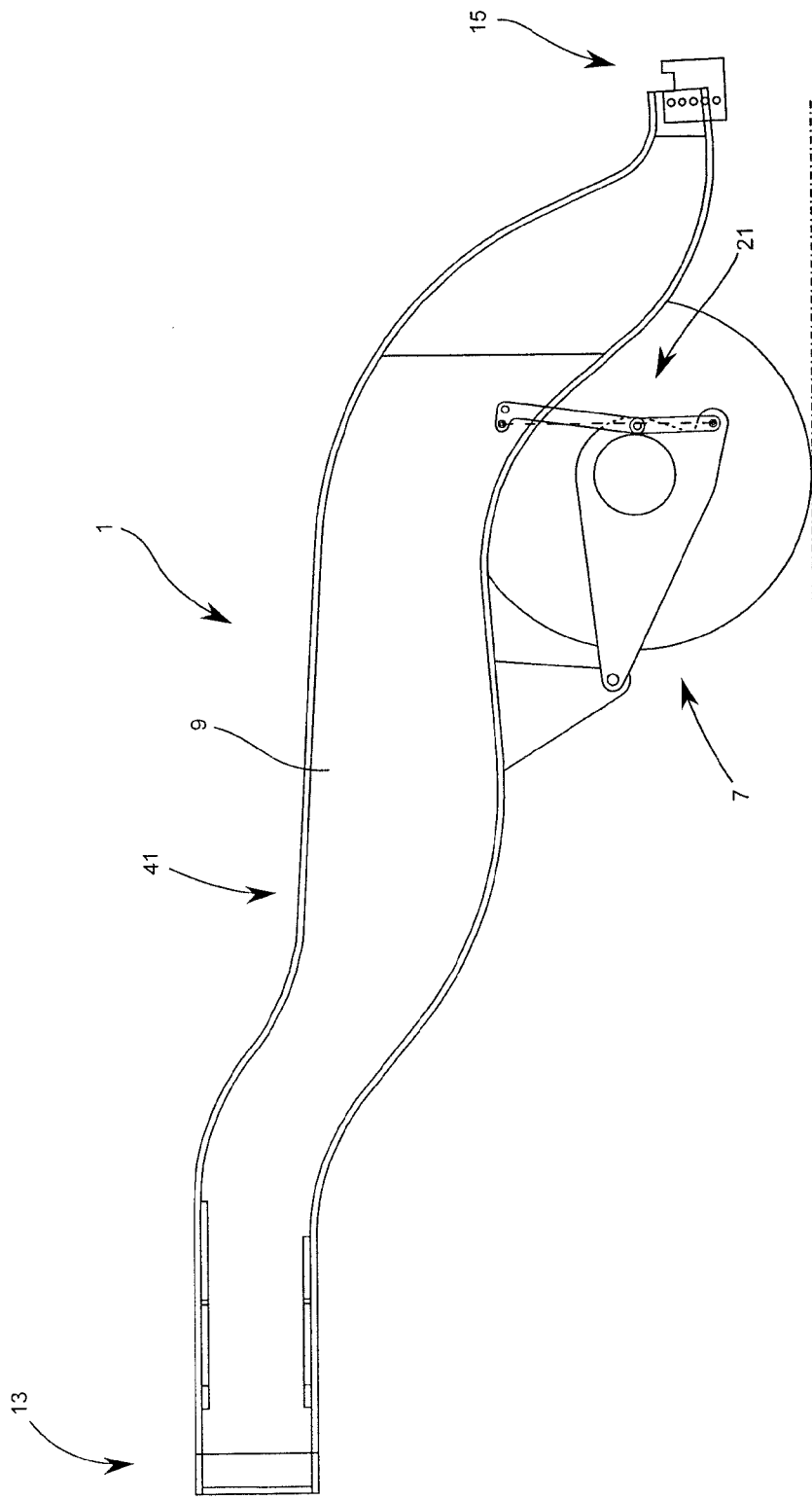
FIG. 6 shows another vehicle recovery tool in a raised position.

FIG. 6 shows an alternative embodiment of the vehicle recovery tool 1 similar to that which is shown in FIG. 1. In this embodiment, the structural member 9 has a raised front end with a first section 13 for attaching to a towing vehicle. Similar to the tool of FIGS. 2-5, the recovery tool 1 can be used to lift a disabled vehicle to be towed, from a lower position at the rear section 15 of the structural member. Alternatively, the vehicle to be towed can be in the form of a lowboy trailer that includes a raised connection point, such as a hitch. In such a case, the structural member 9 also has a raised section 41 for connecting to the low boy trailer. In this instance, the connection to the vehicle being towed, i.e., the lowboy trailer is in front of the axle of the recovery tool 1. In the alternative, the lowboy could have a forward connection point which could be engaged by hook 19 for lifting and towing the front of such a lowboy trailer.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trailing axle arrangement for towing vehicles comprising:

an axle assembly including wheels mounted on an axle;
   a structural member operable to engage a towing vehicle and engage a vehicle to be towed;
   a linear actuator, directly coupled to the axle assembly and coupled to the structural member, configured to lift a portion of the structural member with respect to the axle assembly so as to raise a portion of the vehicle to be towed; and
   a control linkage coupled to the axle assembly and the structural member, the control linkage being configured to move in connection with the linear actuator from an idle position to a static locked position in which the structural member is raised and is supported by the control linkage against a stop.

2. The trailing axle arrangement according to claim 1, wherein the control linkage is connected to the structural member at a body connection pivot, wherein actuation of the linear actuator moves the structural member through a range of positions, and wherein a highest position of the body connection pivot corresponds to an intermediate position of the linear actuator.

3. The trailing axle arrangement according to claim 2, wherein the furthest extension of the linear actuator corresponds to the static locked position of the control linkage.

4. The trailing axle arrangement according to claim 1, wherein the structural member includes a front portion disposed in front of the axle and a rear portion disposed behind the axle, the structural member including a first engagement section on the front portion for engagement with the towing vehicle and a second engagement section on the rear portion for engagement with the vehicle to be towed.

5. The trailing axle arrangement according to claim 4, wherein the structural member is a single fabrication.

6. A trailing axle arrangement for towing vehicles comprising:

an axle assembly including wheels mounted on an axle;
   a structural member comprising a front portion disposed in front of the axle and a rear portion disposed behind the axle, the structural member including a first engagement section on the front portion for engagement with a towing vehicle and a second engagement section on the rear portion for engagement with a vehicle to be towed;
   a hydraulic cylinder, directly coupled to the axle assembly and coupled to the structural member, being configured to lift at least the rear portion of the structural member with respect to the axle assembly to a raised position; and
   a control linkage coupled to the axle assembly and the structural member, the control linkage having an idle position when the structural member is lowered with respect to the axle assembly and a supporting position operable to support a load carried by the structural member when the structural member is in the raised position.

7. The trailing axle arrangement according to claim 6, wherein the control linkage supports the load against a stop.

8. The trailing axle arrangement according to claim 6, wherein the load that is supported by the control linkage is a portion of a total vertical load carried by the structural member.

9. The trailing axle arrangement according to claim 6, wherein the control linkage includes first and second links connected by a central pivot.

10. The trailing axle arrangement according to claim 9, wherein the first and second links are disposed at an acute angle when the control linkage is in the idle position, and wherein the first and second links extend in substantially opposite directions when the control linkage is in the supporting position.

11. The trailing axle arrangement according to claim 9, wherein the central pivot moves through an are as the structural member is raised and lowered, the arc including:
    a top dead center position,
    a first end that corresponds to the idle position of the control linkage, and
    a second end that corresponds to the supporting position of the control linkage,
    the control linkage being configured such that the central pivot passes through the top dead center position as the control linkage is moved from the idle position to the supporting position and the control linkage is supported by a stop when the central pivot reaches the second end of the arc.

12. The trailing axle arrangement according to claim 9, wherein the control linkage is connected to the structural member at a body connection pivot, wherein actuation of the hydraulic cylinder moves the structural member through a range of positions, and wherein a highest position of the body connection pivot occurs when the first and second links are aligned and corresponds to an intermediate position of the hydraulic cylinder.

13. The trailing axle arrangement according to claim 9, wherein a body connection pivot is disposed on an upper end of the first link, and wherein the first link also includes a lateral arm comprising a cylinder pivot where the first link is coupled to an upper end of the hydraulic cylinder.

14. The trailing axle arrangement according to claim 13, wherein the lateral arm of the first link enables the extension of the hydraulic cylinder to move the first and second links through a position in which the first and second links are aligned to a static locked position.

15. The trailing axle arrangement according to claim 14, wherein the control linkage is configured such that retraction of the hydraulic cylinder from the extended position causes the first and second links to move back through the aligned position toward the idle position.

16. A method of towing a vehicle comprising:
    arranging a recovery tool, which includes an axle assembly, between a towing vehicle and a towed vehicle so that one section of the recovery tool engages the towing vehicle and another section is positioned to engage the towed vehicle;
    extending a hydraulic cylinder whose opposite ends are directly coupled to the axle assembly and a structural member of the recovery tool so as to support a weight of the towed vehicle at the axle assembly as the hydraulic cylinder extends, causing the other section of the recovery tool to engage a portion of the disabled vehicle and lift it from a ground surface; and
    transferring at least a part of the weight of the disabled vehicle to the axle assembly by way of a mechanical linkage connected between the structural member and the axle assembly when the hydraulic cylinder is fully extended so that the hydraulic cylinder is substantially relieved of the weight of the disabled vehicle.

17. The method recited in claim 16, wherein the mechanical linkage includes first and second links connected by a central pivot, the first link being connected to the structural member at a body connection pivot and including,
    wherein the first and second links are aligned and the body connection pivot is disposed at a highest point when the control linkage is fully extended, and
    wherein the body connection pivot is below the highest point when the hydraulic cylinder is fully extended.

18. The method recited in claim 17, wherein the first link includes a lateral arm comprising a cylinder pivot where the first link is coupled to an upper end of the hydraulic cylinder, and wherein the lateral arm of the first link enables the extension of the hydraulic cylinder to move the first and second links through the fully extended position of the mechanical linkage.

19. The method recited in claim 16, wherein the mechanical linkage is statically supported by an axle housing of the axle assembly when the mechanical linkage is in a static locked position.

20. The method recited in claim 16, wherein the structural member is coupled to the axle assembly at an axle assembly pivot such that extension of the hydraulic cylinder lifts a rear portion of the structural member with respect to a front portion of the structural member.

21. The method recited in claim 16, wherein the section of the recovery tool engaging the towing vehicle is disposed on a front end of the structural member and the other section of the recovery tool engaging the towed vehicle is disposed on a rear end of the structural member.

22. A trailing axle arrangement for towing vehicles comprising:
    an axle assembly including wheels mounted on an axle;
    a structural member operable to engage a towing vehicle and engage a vehicle to be towed;
    a linear actuator, directly coupled to the axle assembly and coupled to the structural member, configured to lift a portion of the structural member with respect to the axle assembly so as to raise a portion of the vehicle to be towed; and
    means for diverting from the linear actuator to a mechanical linkage at least part of a weight of the vehicle to be towed that is transferred to the structural member when a portion of the vehicle to be towed is raised, thereby relieving the linear actuator from supporting all of the weight communicated to the axle assembly when the portion of the vehicle to be towed is fully raised.

23. A trailing axle arrangement for towing vehicles comprising:
    an axle assembly including wheels mounted on an axle;
    a structural member operable to engage a towing vehicle and engage a vehicle to be towed;
    a linear actuator coupled to the axle assembly and to a body connection pivot of the structural member, the linear actuator configured to lift a portion of the structural member with respect to the axle assembly so as to raise a portion of the vehicle to be towed, wherein actuation of the linear actuator moves the structural member through a range of positions, and wherein the highest position of the body connection pivot corresponds to an intermediate position of the linear actuator; and
    a control linkage coupled to the axle assembly and the structural member, the control linkage being configured to move in connection with the linear actuator from an idle position to a static locked position in which the structural member is raised and is supported by the control linkage against a stop, wherein the static locked position of the control linkage corresponds to the furthest extension of the linear actuator.

24. A trailing axle arrangement for towing vehicles comprising:
- an axle assembly including wheels mounted on an axle;
- a structural member comprising a. front portion disposed in front of the axle and a rear portion disposed behind the axle, the structural member including a first engagement section on the front portion for engagement with a towing vehicle and a second engagement section on the rear portion for engagement with a vehicle to be towed;
- a hydraulic cylinder coupled to the axle assembly and the structural member and being configured to lift at least the rear portion of the structural member with respect to the axle assembly to a raised position; and
- a control linkage, comprising first and second links connected by a central pivot, wherein the control linkage is coupled to the axle assembly and a body connection pivot of the structural member, wherein the body connection pivot is disposed on an upper end of the first link, and wherein the first link also includes a lateral arm comprising a cylinder pivot where the first link is coupled to an upper end of the hydraulic cylinder,
- the control linkage having an idle position when the structural member is lowered with respect to the axle assembly and a supporting position operable to support a load carried by the structural member when the structural member is in the raised position.

25. A method of towing a vehicle comprising:
- arranging a recovery tool, which includes an axle assembly, between a towing vehicle and a towed vehicle so that one section of the recovery tool engages the towing vehicle and another section is positioned to engage the towed vehicle;
- extending a hydraulic cylinder whose opposite ends are fastened to the axle assembly and a structural member of the recovery tool so as to support a weight of the towed vehicle at the axle assembly as the hydraulic cylinder extends, causing the other section of the recovery tool to engage a portion of the disabled vehicle and lift it from a ground surface;
- transferring at least a part of the weight of the disabled vehicle to the axle assembly by way of a mechanical linkage connected between the structural member and the axle assembly when the hydraulic cylinder is fully extended so that the hydraulic cylinder is substantially relieved of the weight of the disabled vehicle,
- wherein the mechanical linkage includes first and second links connected by a central pivot, the first link being connected to the structural member at a body connection pivot,
- wherein the first and second links are aligned and the body connection pivot is disposed at a highest point when the control linkage is fully extended, and
- wherein the body connection pivot is below the highest point when the hydraulic cylinder is frilly extended.

26. The trailing axle arrangement according to claim 22, wherein the diverting means supports the weight against a stop.

27. The trailing axle arrangement according to claim 23, wherein the control linkage is adapted in its static locked position to substantially relieve the linear actuator from supporting a weight of the vehicle communicated to the axle assembly when the portion of the vehicle to be towed is fully raised.

28. The trailing axle arrangement according to claim 24, wherein the control linkage is adapted in its supporting position to substantially relieve the hydraulic cylinder from supporting the load carried by the structural member and communicated to the axle assembly when the vehicle to be towed is fully raised.

29. The method recited in claim 25, wherein the structural member is coupled to the axle assembly at an axle assembly pivot such that extension of the hydraulic cylinder lifts a rear portion of the structural member with respect to a front portion of the structural member.

* * * * *